United States Patent
Singh et al.

(10) Patent No.: US 10,484,165 B2
(45) Date of Patent: Nov. 19, 2019

(54) LATENCY BUFFER CIRCUIT WITH ADAPTABLE TIME SHIFT

(71) Applicant: STMicroelectronics International N.V., Schiphol (NL)

(72) Inventors: Rupesh Singh, Ghaziabad (IN); Ankur Bal, Greater Noida (IN)

(73) Assignee: STMicroelectronics International N.V., Schiphol (NL)

( * ) Notice: Subject to any disclaimer, the term of this patent is extended or adjusted under 35 U.S.C. 154(b) by 0 days.

(21) Appl. No.: 15/846,560

(22) Filed: Dec. 19, 2017

(65) Prior Publication Data
US 2019/0190688 A1    Jun. 20, 2019

(51) Int. Cl.
*H04L 7/00* (2006.01)

(52) U.S. Cl.
CPC ............ *H04L 7/005* (2013.01); *H04L 7/0012* (2013.01)

(58) Field of Classification Search
CPC ......... H04L 7/00; H04L 7/0012; H04L 7/005; H04L 7/0008; H04L 7/0016; H04L 7/002; H04L 7/0025; H04L 7/0033; H04L 7/0037; G06F 1/04; G06F 1/06; G06F 1/08; G06F 1/10; G06F 1/12; G06F 1/14; H04J 3/0682; H04J 3/0685; H03K 5/05; H03K 5/13; H03K 2005/00013; H03K 5/00019; H03K 5/00286; H03K 5/00293; H04B 2215/065
See application file for complete search history.

(56) References Cited

U.S. PATENT DOCUMENTS

| | | | | |
|---|---|---|---|---|
| 6,748,039 B1 * | 6/2004 | Bates | .................. | G06F 5/10 375/354 |
| 6,917,662 B2 * | 7/2005 | Austin | .................. | H03K 5/04 327/115 |
| 6,924,684 B1 * | 8/2005 | Nguyen | .................. | G06F 7/68 327/122 |
| 7,287,105 B1 * | 10/2007 | Owen | .................. | G06F 1/12 365/189.08 |
| 7,519,747 B1 * | 4/2009 | Cory | .................. | G06F 5/10 710/52 |
| 7,573,932 B2 * | 8/2009 | Kim | .................. | G06F 1/08 375/130 |

(Continued)

OTHER PUBLICATIONS

Zabolotny, Wojciech M.: "Automatic Latency Balancing in VHDL-Implemented Complex Pipelined Systems," Journal of Systems Architecture, Nov. 24, 2015 (16 pages).

*Primary Examiner* — Tri H Phan
(74) *Attorney, Agent, or Firm* — Crowe & Dunlevy

(57) ABSTRACT

Data words are received in parallel in response to an edge of a master clock signal and selected for serial output in response to a select signal. For a detected temporal offset of the serially output data words, the generation of the select signal and the master clock signal are controlled to correct for the temporal offset by shifting timing of the edge of the master clock signal and adjusting a sequence of values for the select signal that are generated within one cycle of the master clock signal. For a backward temporal offset, at least one count value in the sequence of values is skipped and the edge of the master clock signal occurs earlier in time. For a forward temporal offset, at least one count value in the sequence of values is held and the edge of the master clock signal occurs later in time.

25 Claims, 5 Drawing Sheets

(56) References Cited

U.S. PATENT DOCUMENTS

| | | | | |
|---|---|---|---|---|
| 8,873,606 B2* | 10/2014 | Zhang | ..................... | H03D 3/02 |
| | | | | 375/219 |
| 8,958,517 B2* | 2/2015 | Su | ............................ | H04L 7/02 |
| | | | | 375/371 |
| 9,509,640 B2* | 11/2016 | Taylor | ....................... | H03L 7/06 |
| 10,063,365 B1* | 8/2018 | Ribo | ....................... | H04L 7/005 |
| 10,110,334 B2* | 10/2018 | Gupta | .................. | H04J 3/0682 |

* cited by examiner

LATENCY BUFFER CIRCUIT WITH ADAPTABLE TIME SHIFT

TECHNICAL FIELD

The present invention relates to a serializer circuit configured to serialize a plurality of parallel data words into a serial stream of data words with an adaptable time shift operation to achieve temporal alignment.

BACKGROUND

There are many applications where it is critical to temporally align multiple serial streams of data words. FIG. 1A shows three communications channels 10, 12 and 14 feeding three corresponding inputs of an application circuit 18. Each communications channel 10, 12 and 14 may, for example, be a data bus that is n-bits wide. The communications channels 10, 12 and 14 carry blocks 20, 22 and 24, respectively, of serially transmitted n-bit data words in a stream. However, the blocks may not be temporally aligned. As illustrated, the block 24 (with serially transmitted n-bit data words C1-CN) on communications channel 14 temporally leads the block 20 (with serially transmitted n-bit data words A1-AN) on communications channel 10, and the block 20 on communications channel 10 temporally leads the block 22 (with serially transmitted n-bit data words B1-BN) on communications channel 12. The system clock (CLK) is shown in relation to the temporal offsets to illustrate that the extent of the offset to be addressed may be more than one cycle of the system clock (wherein one data word is transmitted over the channel for each cycle of the system clock). This temporal offset of the blocks 20, 22 and 24 can cause problems with the operation of the application circuit 18. For example, if the application circuit 18 relates to a beam forming system, the temporal offset can cause a corresponding offset of the formed transmit beam. Other applications such as with parallel data processing may require temporal alignment of the multiple channels of input data words.

A transmitter TX is provided for each of the three communications channels 10, 12 and 14. Each transmitter TX operates as a serializer circuit that receives the n-bit data words X1-XN (where X=A, B or C) in parallel at a first frequency related to clock MST_CLK and generates the block 20, 22 or 24 of serially transmitted n-bit data words X1-XN for transmission over the corresponding communications channel 10, 12 or 14 at a second frequency (wherein the second frequency may be N times the first frequency) associated with the system clock CLK.

A control circuit 40 operates to detect 42 the existence of a temporal misalignment and respond thereto by generating control signals 44 applied to the transmitters TX to effectuate a temporal adjustment of the blocks 20, 22 and 24 of serially transmitted n-bit data words X1-XN output from the transmitters TX. To achieve a desired temporal alignment 28 as shown in FIG. 1B, the control signals 44 cause the block 22 to be shifted forward in time (reference 32) relative to block 22 by the transmitter TX for channel 12 and cause the block 24 to be shifted backward in time (reference 34) relative to block 22 by the transmitter TX for channel 14.

There are a number of transmitter TX solutions known to those skilled in the art which can respond to control signals 44 specifying a forward shift (FwS) and/or backward shift (BwS) in connection with the generation of a block of serially transmitted n-bit data words to achieve temporal alignment. However, each of these known solutions utilizes a relatively large memory space and complicated control logic for accessing the memory space. The large memory space is attributed to the need to store multiple data words from past inputs in order to be able to re-align the temporal output with respect to a transmitter TX having a maximal latency. This may be accomplished with a circuit of the type shown in FIG. 1C which uses a very large parallel in/serial out first-in first-out (FIFO) circuit 70 designed to store and selectively address (using address control and pointer circuitry 72) the multiple data words from past inputs in response to forward shift (pp) and backward shift (mm) commands processed by a calibration logic circuit to generate an offset (off) signal generated by a counter circuit which controls the offsetting of the address pointer (RD_PTR) for reading from the circuit 70 as well as the operation for shifting the circuit 70 by N. For example, a latency of 20 words (plus/minus 10 temporal shifts possible) for an N=10 parallel lane communications channel 74 would mandate a storage minimum (N+2*Cmax+2) of 30 words for the circuit 70 and 30:1 multiplexers with related control logic. The implemented integrated circuit for such a prior art transmitter as shown in FIG. 1C occupies a large amount of circuit area and consumes a large amount of power. There is a need in the art for a transmitter that addresses the foregoing and other problems.

SUMMARY

In an embodiment, a circuit comprises: a multiplexer having a plurality of inputs configured to receive data words in parallel and having an output configured to output selected ones of the received data words in series in response to a select signal; a first-in first-out (FIFO) circuit configured to supply the data words in parallel in response to an edge of a master clock signal; and a timing control circuit configured to generate the select signal and the master clock signal in response to a temporal shift signal and a system clock signal, wherein the timing control circuit responds to an assertion of the temporal shift signal by modifying a duty cycle of the master clock signal and controlling a sequence of values for the select signal.

In an embodiment, a circuit comprises: a multiplexer having a plurality of inputs configured to receive data words in parallel and having an output configured to output selected ones of the received data words in series in response to a select signal; a first-in first-out (FIFO) circuit configured to supply the data words in parallel in response to an edge of a master clock signal; and a timing control circuit configured to generate the select signal and the master clock signal in response to a temporal shift signal and a system clock signal, wherein the timing control circuit responds to an assertion of the temporal shift signal by shifting timing of said edge of the master clock signal and controlling a sequence of values for the select signal that are generated within one cycle of the master clock signal.

In an embodiment, a method comprises: providing a plurality of data words in parallel in response to an edge of a master clock signal; serially selecting ones of the received plurality of data words in response to a sequence of values of a select signal; outputting the serially selecting ones of the received plurality of data words in a serial stream of data words; detecting a temporal offset of said serial stream of data words; controlling the sequence of values for the select signal that are generated within one cycle of the master clock signal to: skip at least one count value in the sequence of values if the detected temporal offset is a backward temporal offset; and hold at least one count value in the sequence of values for a longer period of time if the detected temporal offset is a forward temporal offset; and shifting timing of the edge of the master clock signal to account for the controlled sequence of values for the select signal.

BRIEF DESCRIPTION OF THE DRAWINGS

The accompanying drawings are included to provide a further understanding of the invention and are incorporated in and constitute a part of this specification, illustrate embodiments of the invention and together with the description serve to explain the principles of the invention.

In the drawings.

DETAILED DESCRIPTION

Figure 1A:
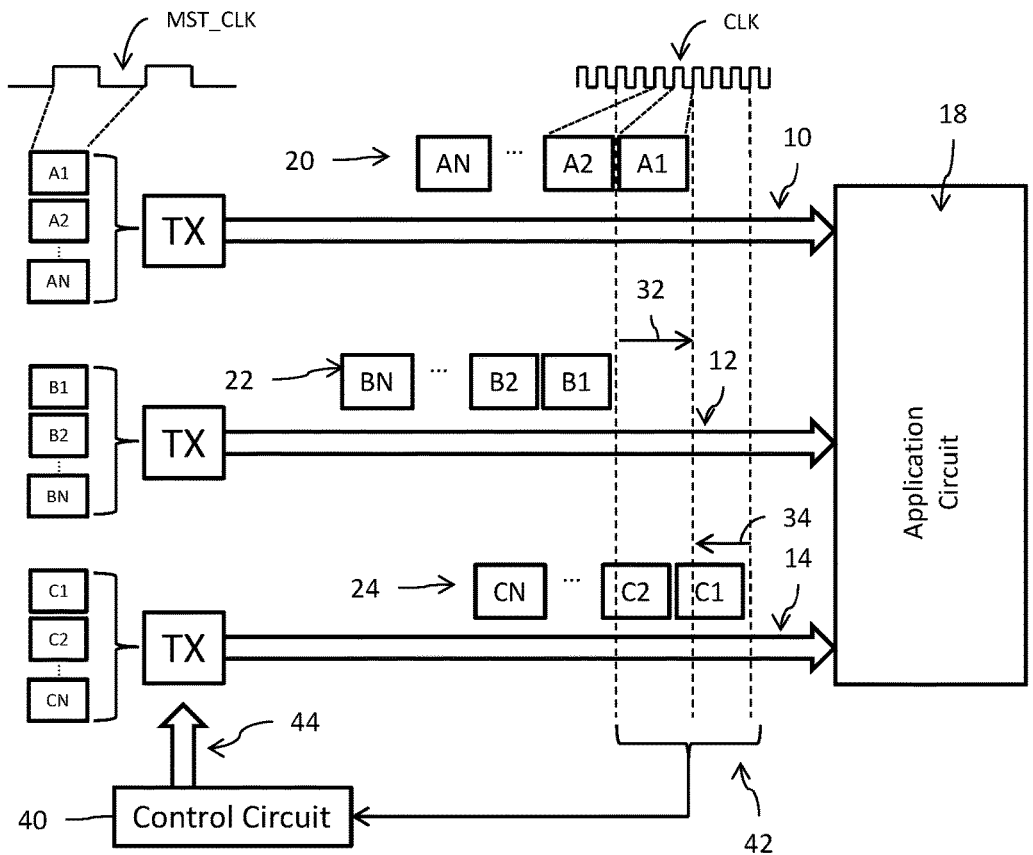
FIGS. 1A and 1B illustrate an operation for temporally aligning multiple serial streams of data words.
Figure 2:
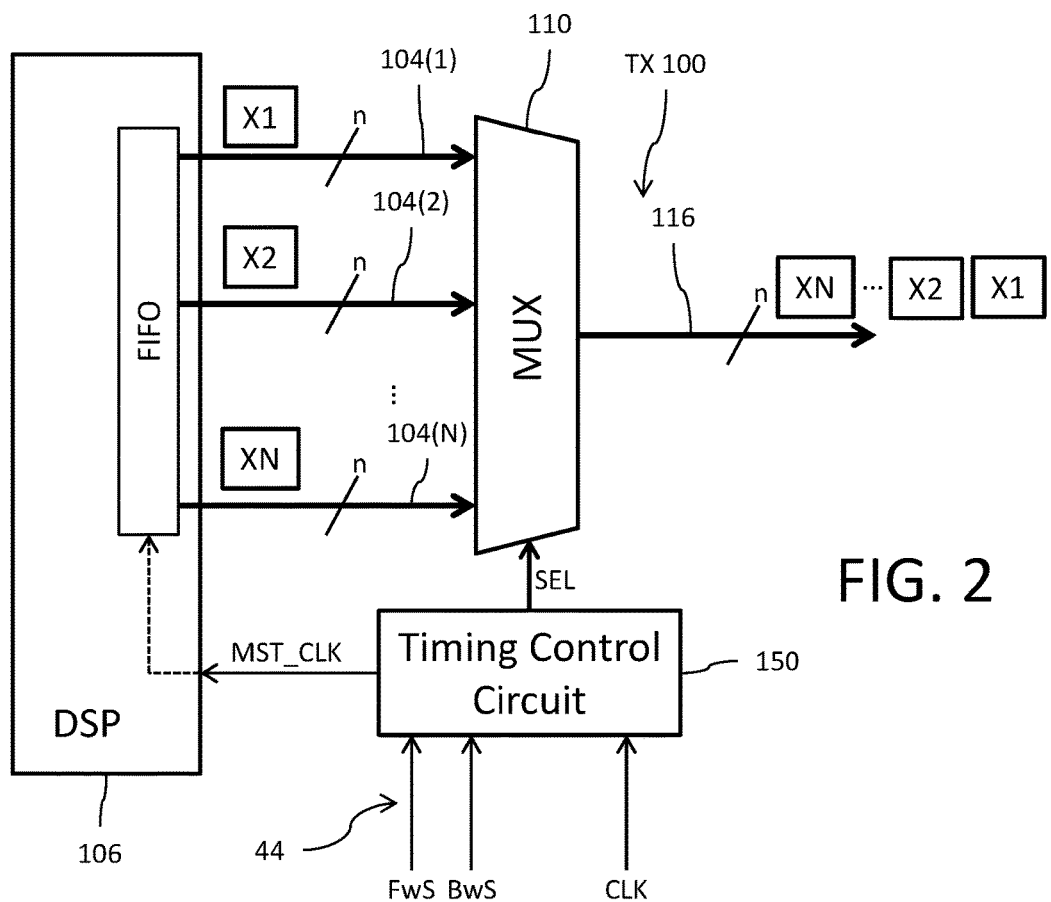
FIG. 2 is a block diagram of a transmitter operating to serialize parallel received data words to generate a block of serial data words with temporal adjustment.

Reference is now made to FIG. 2 showing a block diagram of a transmitter TX 100. The transmitter TX 100 may be utilized, for example, for each of the transmitters TX shown in FIG. 1A and is responsive to the control signals 44 generated by the control circuit 40 for the purpose of effectuating forward/backward shifts in time with respect to the generation of the serialized data word output.

The transmitter TX 100 includes a plurality of data word lanes 104(1)-104(N) that are coupled to outputs of a synchronizing multi-lane first-in first-out (FIFO) circuit of a digital circuit 106. Each data word lane 104 may, for example, carry an n-bit data word X, and the FIFO is accordingly an N lane, with n-bits per lane, FIFO circuit. The FIFO of the digital circuit 106 receives n-bit data words X1-XN in parallel and operates to store and then output those n-bit data words X1-XN in parallel.

The digital circuit 106 may comprise a digital signal processing (DSP) circuit that operates as a slave device with the transmitter TX 100 functioning as a master device. The transmitter TX 100 generates a master clock signal MST_CLK that is applied to the digital circuit 106. The slave response of the digital circuit 106 to a particular edge of the master clock signal MST_CLK, for example, the leading edge, is to cause the FIFO to output a plurality of n-bit data words X1-XN in parallel on the data word lanes 104(1)-104(N) at a first frequency related to the frequency of the master clock signal MST_CLK.

The transmitter TX 100 further includes an N×1 multiplexer circuit (MUX) 110 having N n-bit inputs coupled to the data word lanes 104(1)-104(N) and one n-bit output coupled to a communications channel 116 (corresponding to a channel 10, 12 or 14 of FIG. 1A). Operation of the MUX 110 is controlled by a selection signal SEL. The data value of the selection signal SEL chooses a particular one of the N n-bit inputs of the MUX 110 to be connected to the one n-bit output of the MUX 110.

The master clock signal MST_CLK and selection signal SEL are generated by a timing control circuit 150 in response to a system clock CLK and two shift control signals (forward shift FwS and backward shift BwS) generated by the control circuit 40 in response to detection of the existence of a temporal misalignment (see, FIG. 1A). The system clock CLK operates at a second frequency (wherein the second frequency may be N times the first frequency).

Figure 3A:
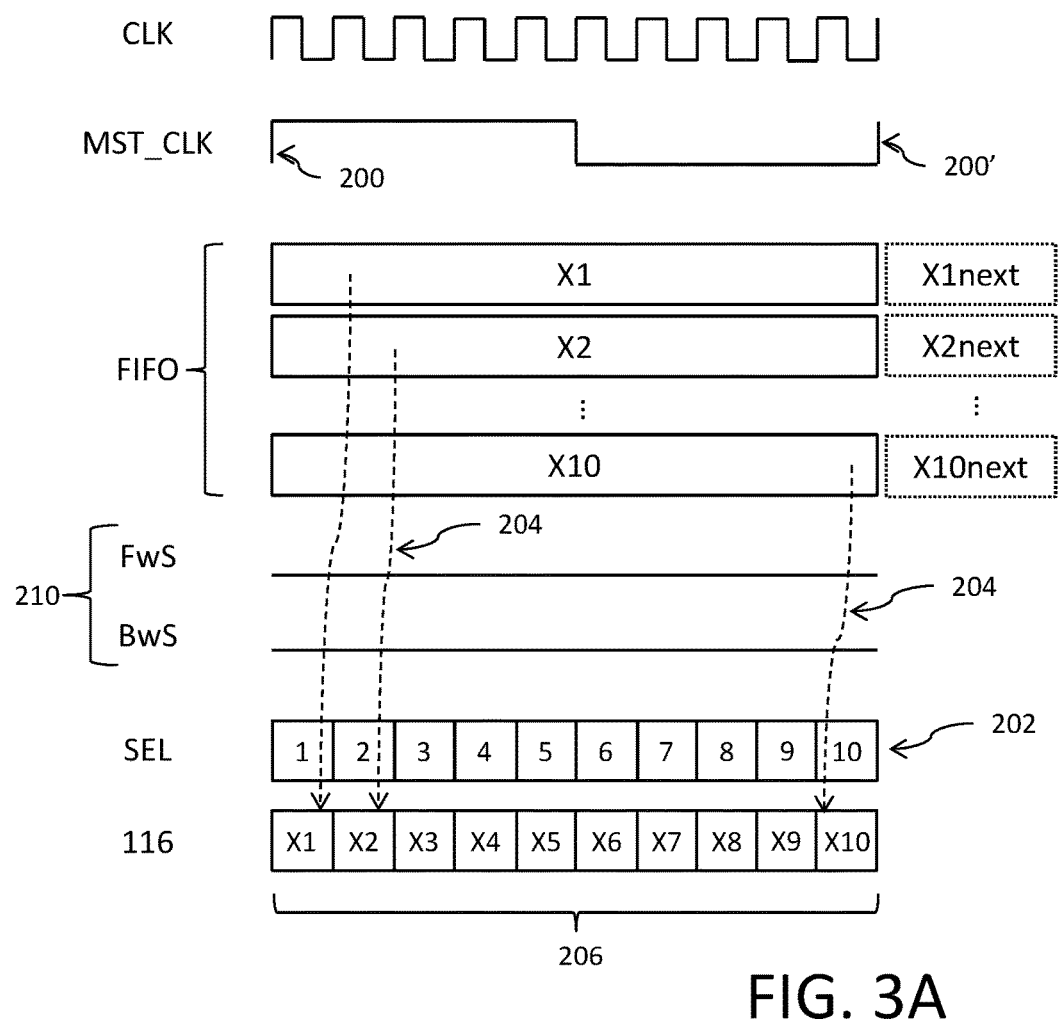
FIGS. 3A-3C are timing diagrams illustrating operation of the transmitter of FIG. 2 in different operational modes relating to providing temporal adjustment.

Operation of the transmitter TX 100 in a normal mode of operation, where neither the forward shift FwS control signal nor the backward shift BwS control signal are asserted (reference 210), may be better understood with reference to the timing diagram of FIG. 3A. For purposes of this illustration, by example only, N=10 and thus there are ten cycles of the system clock CLK for each single cycle of the master clock signal MST_CLK. The duty cycle of the master clock signal MST_CLK is nominally 50%, so there are five cycles of the system clock CLK in the positive phase of the master clock signal MST_CLK and five cycles of the system clock CLK in the negative phase of the master clock signal MST_CLK. The timing control circuit 150 includes a circuit, such as multi-bit ring counter circuit, that receives the system clock CLK and generates the master clock signal MST_CLK in phase and with the appropriate fractional frequency relationship of 1/N and duty cycle. At the leading edge 200 of the master clock signal MST_CLK, the slave response of the FIFO within the DSP is to present, in parallel, ten n-bit data words X1-X10 on the corresponding data word lanes 104(1)-104(10). Responsive to each cycle of the system clock CLK within one cycle of the master clock signal MST_CLK, the timing control circuit 150 increments (reference 202) the selection signal SEL so that the selection signal SEL counts from 1 to 10. With each count of the selection signal SEL, the MUX 110 selects (reference 204) the corresponding data word lane 104(1)-104(10) for connection to the one n-bit output and passes the n-bit data word on the selected data word lane for output on the communications channel 116. The result of this operation is the serialization of the ten parallel n-bit data words X1-X10 presented by the FIFO to produce a block (reference 206) of ten serial n-bit data words X1-X10. At the next subsequent leading edge 200' of the master clock signal MST_CLK, the FIFO presents, in parallel, the next ten n-bit data words X1next-X10next on the corresponding data word lanes 104(1)-104(10) and the process repeats.

Figure 3B:
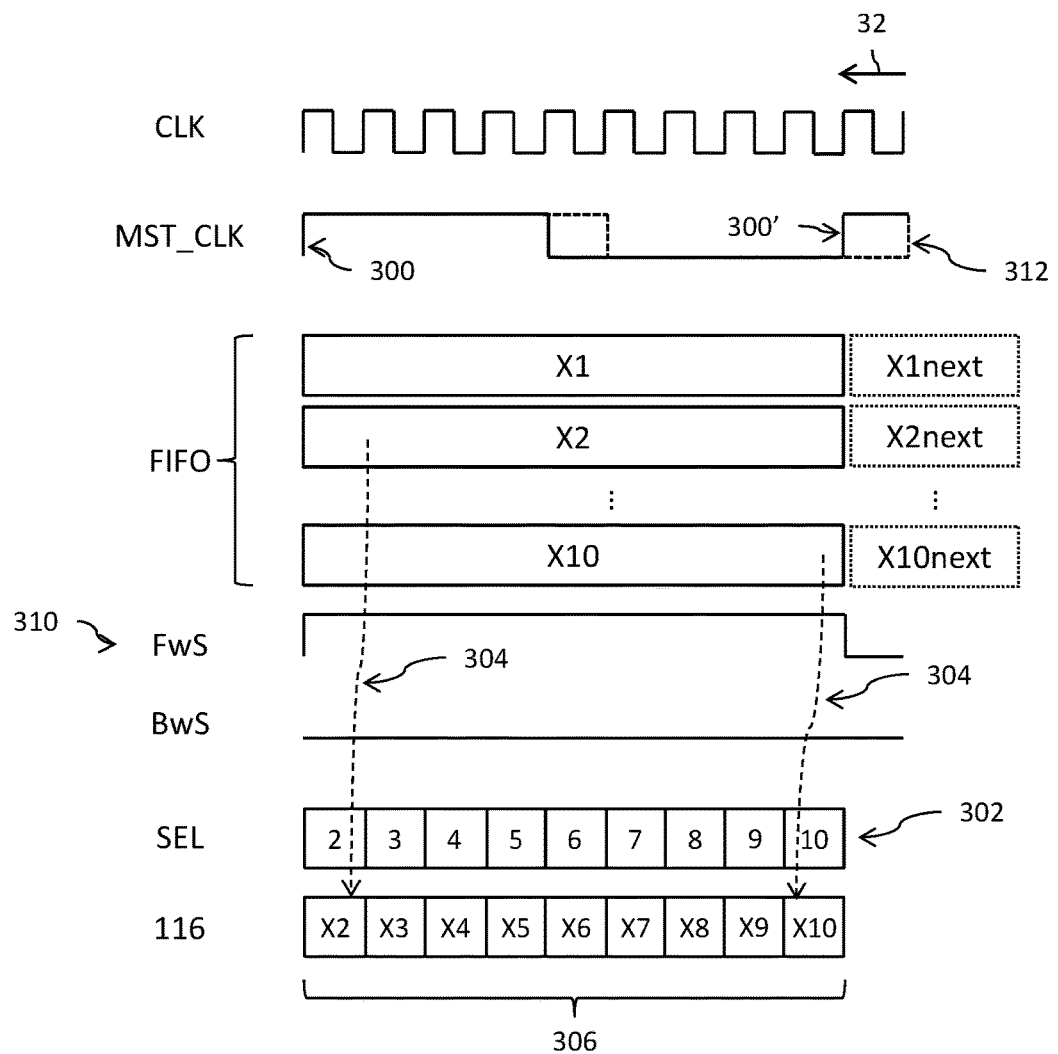

Operation of the transmitter TX 100 in a forward shift mode of operation, where the forward shift FwS control signal is asserted (reference 310), may be better understood with reference to the timing diagram of FIG. 3B. Again, for purposes of this illustration, by example only, N=10. As noted above with respect to FIG. 3A, there are normally ten cycles of the system clock CLK for each single cycle of the master clock signal MST_CLK. However, in the context of a forward shift as indicated by assertion of the forward shift FwS control signal, there will be one less cycle of the system clock CLK for a current single cycle of the master clock signal MST_CLK (i.e., there will only be nine cycles of the system clock CLK). So, in the forward shift mode of operation, the master clock signal MST_CLK has a duty cycle that is different from 50%, and in this example is less than 50%. For context, the dotted lines show the master clock signal MST_CLK for the FIG. 3A operational mode. The timing control circuit 150 receives the system clock CLK and generates the master clock signal MST_CLK in phase and with the appropriate duty cycle. At the leading edge 300 of the master clock signal MST_CLK, the slave response of the FIFO within the DSP is to present, in parallel, ten n-bit data words X1-X10 on the corresponding data word lanes 104(1)-104(10). Responsive to each cycle of the system clock CLK within the current one cycle of the master clock signal MST_CLK, the timing control circuit 150 increments (reference 302) the selection signal SEL.

Figure 1B:
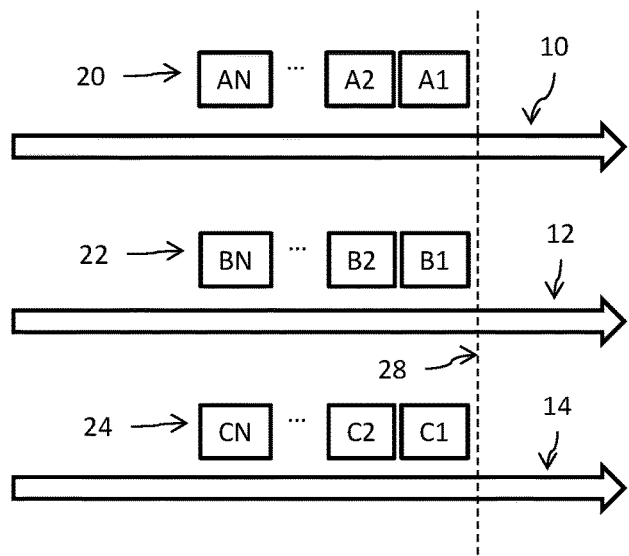
Figure 1C:
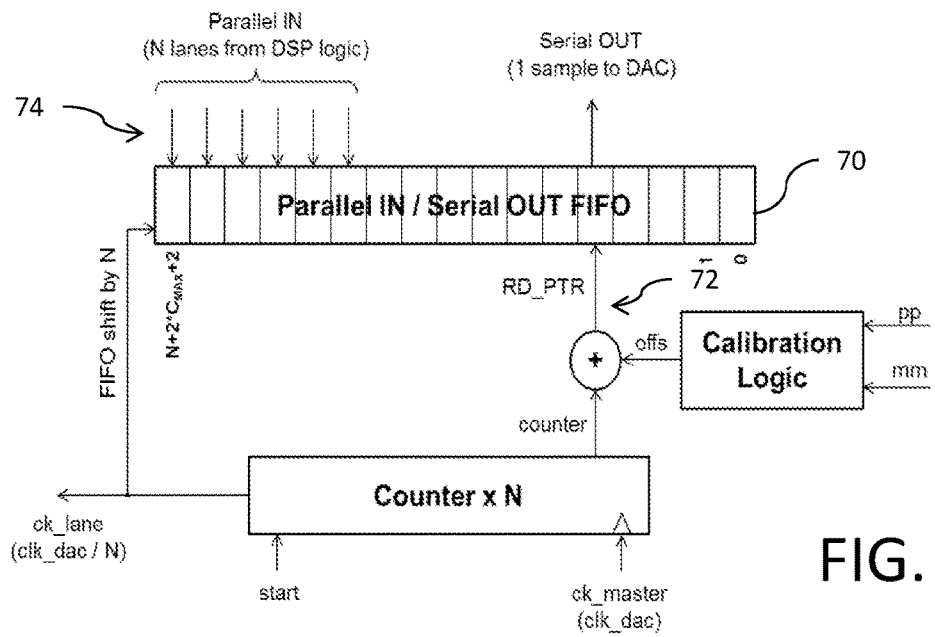
FIG. 1C is a block diagram of a transmitter operating to serialize parallel received data words to generate a block of serial data words with temporal adjustment.

Rather than have the selection signal SEL count from 1 to 10, however, the assertion 310 of the forward shift FwS control signal, along with the reduced duty cycle of the master clock signal MST_CLK, causes the timing control circuit 150 to skip one of the count increments. In this example, count 1 is skipped; although it will be understood that any selected one of the counts from 1 to 10 could be selected to be skipped. As a result, the selection signal SEL counts from 2 to 10 (with four cycles of the system clock CLK in the positive phase of the master clock signal MST_CLK and five cycles of the system clock CLK in the negative phase of the master clock signal MST_CLK). With each count of the selection signal SEL, the MUX 110 selects (reference 304) the corresponding data word lane 104(2)-104(10) for connection to the one n-bit output and passes the n-bit data word on the selected data word lane for output on the communications channel 116. The result of this operation is the serialization of the nine selected parallel n-bit data words X2-X10 presented by the FIFO to produce a block (reference 306) of nine serial n-bit data words X2-X10. The effective result of the forward shift mode of operation shown in FIG. 3B is to advance the serialization of the ten parallel n-bit data words X1-X10 by one cycle of the system clock CLK (reference 32, FIG. 1A) at the expense of losing one of the n-bit data words (in this example n-bit data word X1). It is not anticipated that loss of one n-bit data word will have any adverse effect of application circuit (reference 18, FIG. 1A) operation, and any adverse effect is outweighed by the advantage of moving the serialization of the n-bit data words closer to temporal alignment (reference 28, FIG. 1B). Reference 312 shows that the effect of this operation on the master clock signal MST_CLK is to cause the next subsequent leading edge to occur earlier in time than with respect to the normal mode of FIG. 3A; thus, the next FIFO presentation, in parallel, of the next ten n-bit data words X1-X10 will occur sooner in time. At the next leading edge 300' of the master clock signal MST_CLK, the FIFO presents, in parallel, the next ten n-bit data words X1next-X10next on the corresponding data word lanes 104(1)-104(10) and the process of FIG. 3A is performed (or if the forward shift FwS control signal is asserted again then the process of FIG. 3B repeats).

With reference once again to the scenario depicted in FIG. 1A, it is noted that block 20 (with serially transmitted n-bit data words A1-AN) on communications channel 10 temporally leads the block 22 (with serially transmitted n-bit data words B1-BN) on communications channel 12. If we assume that the transmitter TX for channel 10 sets the desired temporal alignment (reference 28, FIG. 1B), then the transmitter TX 100 for channel 12 is transmitting with a backward offset of four cycles of the system clock CLK. This backward offset is detected by the control circuit 40, and the control circuit 40 will assert the forward shift FwS control signal (reference 310, FIG. 3B) four times in connection with four performances of the operation shown in FIG. 3B to shift the n-bit data words B1-BN forwards (reference 32) by four cycles of the system clock CLK. This achieves the temporal alignment shown in FIG. 1B.

Figure 3C:
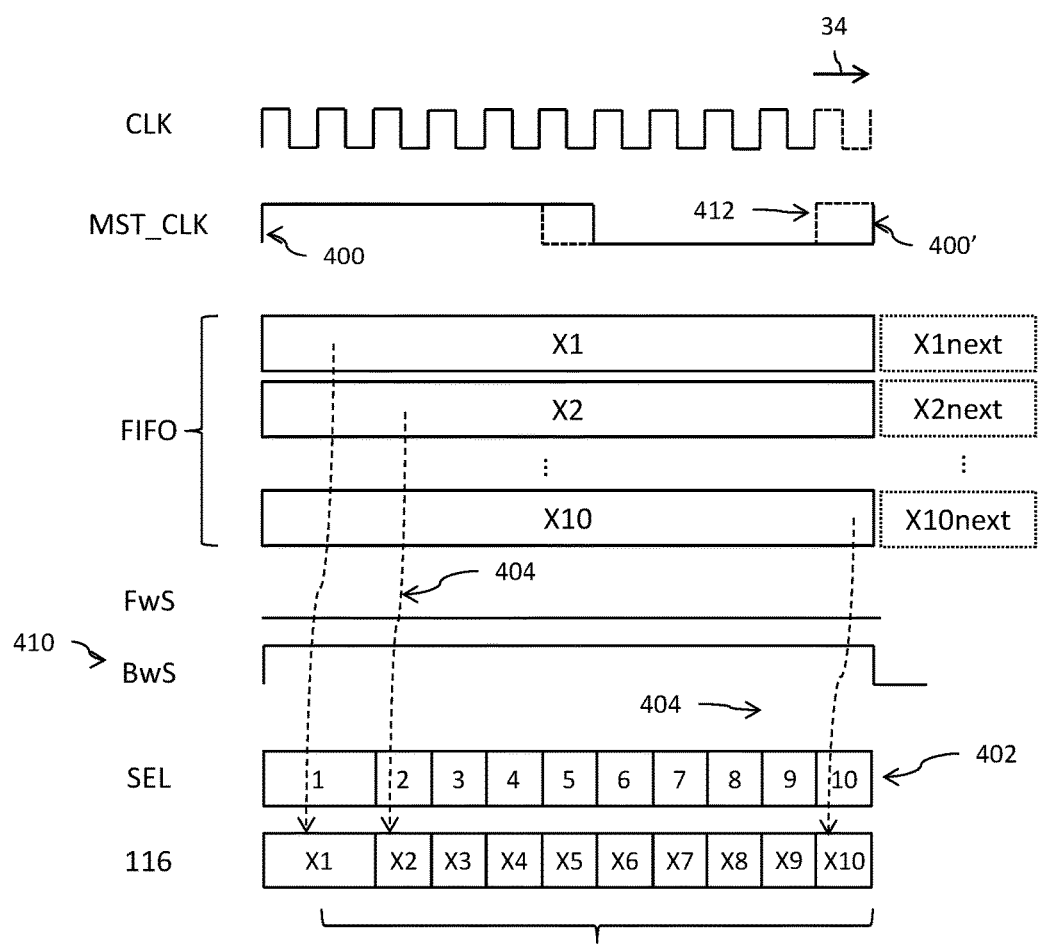

Operation of the transmitter TX 100 in a backward shift mode of operation, where the backward shift BwS control signal is asserted (reference 410), may be better understood with reference to the timing diagram of FIG. 3C. Again, for purposes of this illustration, by example only, N=10. As noted above with respect to FIG. 3A, there are normally ten cycles of the system clock CLK for each single cycle of the master clock signal MST_CLK. However, in the context of a backward shift as indicated by assertion of the backward shift BwS control signal, there will be one more cycle of the system clock CLK for a current single cycle of the master clock signal MST_CLK (i.e., there will be eleven cycles of the system clock CLK). So, in the backward shift mode of operation, the master clock signal MST_CLK has a duty cycle that is different from 50%, and in this example is greater than 50%. For context, the dotted lines show the master clock signal MST_CLK for the FIG. 3A operational mode. The timing control circuit 150 receives the system clock CLK and generates the master clock signal MST_CLK in phase and with the appropriate duty cycle. At the leading edge 400 of the master clock signal MST_CLK, the slave response of the FIFO within the DSP is to present, in parallel, ten n-bit data words X1-X10 on the corresponding data word lanes 104(1)-104(10). Responsive to each cycle of the system clock CLK within the current one cycle of the master clock signal MST_CLK, the timing control circuit 150 increments (reference 402) the selection signal SEL. In this scenario, the selection signal SEL still counts from 1 to 10, however, the assertion 410 of the backward shift BwS control signal, along with the increased duty cycle of the master clock signal MST_CLK, causes the timing control circuit 150 to hold one of the count increments for two complete cycles of the system clock CLK. In this example, count 1 is held for two cycles of the system clock CLK; although it will be understood that any selected one of the counts from 1 to 10 could be selected to be held. As a result, the selection signal SEL counts from 1 to 10 (with six cycles of the system clock CLK in the positive phase of the master clock signal MST_CLK and five cycles of the system clock CLK in the negative phase of the master clock signal MST_CLK). With each count of the selection signal SEL, the MUX 110 selects (reference 404) the corresponding data word lane 104(2)-104(10) for connection to the one n-bit output and passes the n-bit data word on the selected data word lane for output on the communications channel 116. The result of this operation is the serialization of the ten selected parallel n-bit data words X1-X10 presented by the FIFO to produce a block (reference 406) of ten serial n-bit data words X1-X10. The effective result of the backward shift mode of operation shown in FIG. 3C is to delay the serialization of the ten parallel n-bit data words X1-X10 by one cycle of the system clock CLK (reference 34, FIG. 1A) at the expense of presenting one of the n-bit data words (in this example n-bit data word X1) for an extended period of time. It is not anticipated that extended presentation of one n-bit data word will have any adverse effect of application circuit (reference 18, FIG. 1A) operation, and any adverse effect is outweighed by the advantage of moving the serialization of the n-bit data words closer to temporal alignment (reference 28, FIG. 1B). Reference 412 shows that the effect of this operation on the master clock signal MST_CLK is to cause the next leading edge to occur later in time than with respect to the normal mode of FIG. 3A; thus, the next FIFO presentation, in parallel, of the next ten n-bit data words X1-X10 will occur later in time. At the next leading edge 400' of the master clock signal MST_CLK, the FIFO presents, in parallel, the next ten n-bit data words X1next-X10next on the corresponding data word lanes 104(1)-104(10) and the process of FIG. 3A is performed (or if the backward shift BwS control signal is asserted again then the process of FIG. 3C repeats).

With reference once again to the scenario depicted in FIG. 1A, it is noted that block 24 (with serially transmitted n-bit data words C1-CN) on communications channel 14 temporally leads the block 20 (with serially transmitted n-bit data words A1-AN) on communications channel 10. If we assume that the transmitter TX for channel 10 sets the desired temporal alignment (reference 28, FIG. 1B), then the transmitter TX 100 for channel 14 is transmitting with a forward offset of three cycles of the system clock CLK. This forward offset is detected by the control circuit 40, and the control circuit 40 will assert the backward shift BwS control signal (reference 410, FIG. 3C) three times in connection with three performances of the operation shown in FIG. 3C to shift the n-bit data words C1-CN backwards (reference 34) by three cycles of the system clock CLK. This achieves the temporal alignment shown in FIG. 1B.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A circuit, comprising:
a multiplexer having a plurality of inputs configured to receive data words in parallel and having an output configured to output selected ones of the received data words in series in response to a select signal;
a first-in first-out (FIFO) circuit configured to supply the data words in parallel in response to an edge of a master clock signal; and
a timing control circuit configured to generate the select signal and the master clock signal in response to a temporal shift signal and a system clock signal, wherein the timing control circuit responds to an assertion of the temporal shift signal by modifying a duty cycle of the master clock signal and controlling a sequence of values for the select signal.

2. The circuit of claim 1, wherein the temporal shift signal is a forward shift signal and wherein the sequence of values for the select signal is controlled by the timing control circuit to skip at least one count value in the sequence of values for the select signal.

3. The circuit of claim 2, wherein the timing control circuit reduces the duty cycle of the master clock signal to account for the skipping of said at least one count value in the sequence of values for the select signal.

4. The circuit of claim 2, wherein modification of the duty cycle of the master clock signal comprises a reduction of a length of phase of the master clock signal to account for the skipping of said at least one count value in the sequence of values for the select signal.

5. The circuit of claim 2, wherein modification of the duty cycle of the master clock signal causes a next edge of the master clock signal causing the FIFO circuit to supply the data words in parallel to occur earlier in time so as to advance multiplexer output of the selected ones of the received data words in series.

6. The circuit of claim 2, further comprising a control circuit configured to detect a backward temporal offset of a series of data words output from the multiplexer and assert the forward shift signal.

7. The circuit of claim 1, wherein the temporal shift signal is a backward shift signal and wherein the sequence of values for the select signal is controlled by the timing control circuit to hold at least one count value in the sequence of values for the select signal for a longer time than other count values in the sequence of values for the select signal.

8. The circuit of claim 7, wherein the timing control circuit increases the duty cycle of the master clock signal to account for the holding of said at least one count value in the sequence of values for the select signal.

9. The circuit of claim 7, wherein modification of the duty cycle of the master clock signal comprises an increase of a length of phase of the master clock signal to account for the holding of said at least one count value in the sequence of values for the select signal.

10. The circuit of claim 7, wherein modification of the duty cycle of the master clock signal causes a next edge of the master clock signal causing the FIFO circuit to supply the data words in parallel to occur later in time so as to delay multiplexer output of the selected ones of the received data words in series.

11. The circuit of claim 7, further comprising a control circuit configured to detect a forward temporal offset of a series of data words output from the multiplexer and assert the temporal shift signal.

12. A circuit, comprising:
a multiplexer having a plurality of inputs configured to receive data words in parallel and having an output configured to output selected ones of the received data words in series in response to a select signal;
a first-in first-out (FIFO) circuit configured to supply the data words in parallel in response to an edge of a master clock signal; and
a timing control circuit configured to generate the select signal and the master clock signal in response to a temporal shift signal and a system clock signal, wherein the timing control circuit responds to an assertion of the temporal shift signal by shifting timing of said edge of the master clock signal and controlling a sequence of values for the select signal that are generated within one cycle of the master clock signal.

13. The circuit of claim 12, wherein the temporal shift signal is a forward shift signal and wherein the sequence of values for the select signal is controlled by the timing control circuit to skip at least one count value in the sequence of values for the select signal that are generated within one cycle of the master clock signal.

14. The circuit of claim 13, wherein the timing control circuit causes the edge of the master clock signal causing the FIFO circuit to supply the data words in parallel to occur earlier in time due to the skipping of said at least one count value in the sequence of values for the select signal.

15. The circuit of claim 13, further comprising a control circuit configured to detect a backward temporal offset of a series of data words output from the multiplexer and assert the forward shift signal.

16. The circuit of claim 12, wherein the temporal shift signal is a backward shift signal and wherein the sequence of values for the select signal is controlled by the timing control circuit to hold at least one count value in the sequence of values for the select signal for a longer time than other count values in the sequence of values for the select signal.

17. The circuit of claim 16, wherein the timing control circuit causes the edge of the master clock signal causing the FIFO circuit to supply the data words in parallel to occur later in time due to the holding of said at least one count value in the sequence of values for the select signal.

18. The circuit of claim 16, further comprising a control circuit configured to detect a forward temporal offset of a series of data words output from the multiplexer and assert the backward shift signal.

19. A method, comprising:
providing a plurality of data words in parallel in response to an edge of a master clock signal;

serially selecting ones of the received plurality of data words in response to a sequence of values of a select signal;

outputting the serially selecting ones of the received plurality of data words in a serial stream of data words;

detecting a temporal offset of said serial stream of data words;

controlling the sequence of values for the select signal that are generated within one cycle of the master clock signal to:

skip at least one count value in the sequence of values if the detected temporal offset is a backward temporal offset; and hold at least one count value in the sequence of values for a longer period of time if the detected temporal offset is a forward temporal offset; and shifting timing of the edge of the master clock signal to account for the controlled sequence of values for the select signal.

20. The method of claim 19, wherein shifting timing causes the edge of the master clock signal causing the plurality of data words to be provided in parallel to occur earlier in time due to the skipping of said at least one count value in the sequence of values for the select signal.

21. The method of claim 19, wherein shifting timing causes the edge of the master clock signal causing the plurality of data words to be provided in parallel to occur later in time due to the holding of said at least one count value in the sequence of values for the select signal.

22. A method, comprising:

providing a plurality of data words in parallel in response to an edge of a master clock signal;

serially selecting ones of the received plurality of data words in response to a sequence of values of a select signal;

outputting the serially selecting ones of the received plurality of data words in a serial stream of data words;

detecting a temporal offset of said serial stream of data words;

controlling the sequence of values for the select signal that are generated within one cycle of the master clock signal to skip at least one count value in the sequence of values if the detected temporal offset is a backward temporal offset; and shifting timing of the edge of the master clock signal to account for the controlled sequence of values for the select signal.

23. The method of claim 22, wherein shifting timing comprises skipping of said at least one count value in the sequence of values for the select signal in order to cause the edge of the master clock signal to occur earlier in time.

24. A method, comprising:

providing a plurality of data words in parallel in response to an edge of a master clock signal;

serially selecting ones of the received plurality of data words in response to a sequence of values of a select signal;

outputting the serially selecting ones of the received plurality of data words in a serial stream of data words;

detecting a temporal offset of said serial stream of data words;

controlling the sequence of values for the select signal that are generated within one cycle of the master clock signal to hold at least one count value in the sequence of values for a longer period of time if the detected temporal offset is a forward temporal offset; and shifting timing of the edge of the master clock signal to account for the controlled sequence of values for the select signal.

25. The method of claim 24, wherein shifting timing comprises holding of said at least one count value in the sequence of values for the select signal in order to cause the edge of the master clock signal to occur later in time.

* * * * *